June 10, 1969     K. WARNECKE     3,448,487
CHARGING DEVICE FOR TIRE VULCANIZING PRESSES
Filed June 9, 1966
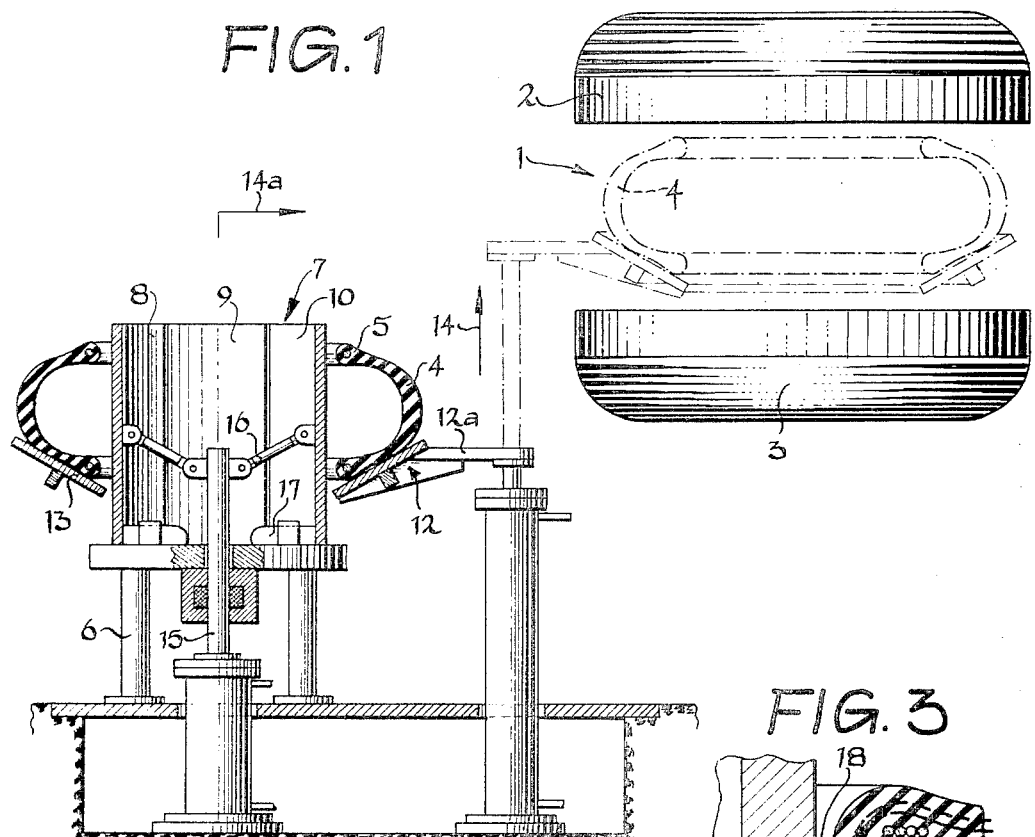
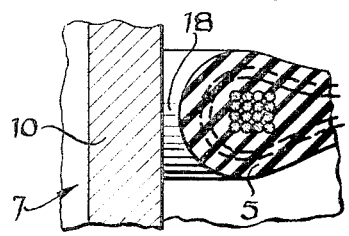
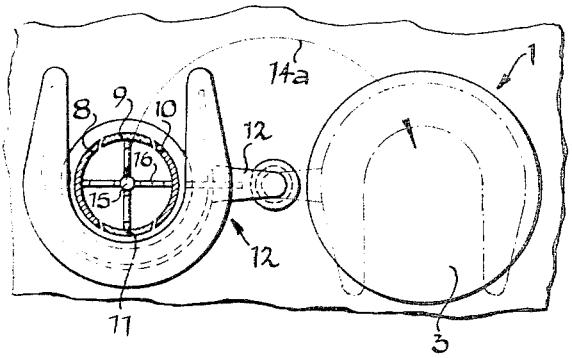

United States Patent Office 3,448,487
Patented June 10, 1969

3,448,487
CHARGING DEVICE FOR TIRE
VULCANIZING PRESSES
Karl Warnecke, Isernhagen, Germany, assignor to Continental Gummi-Werke Aktiengesellschaft, Hannover, Germany
Filed June 9, 1966, Ser. No. 556,451
Claims priority, application Germany, June 10, 1965, C 36,091
Int. Cl. B29h 11/00
U.S. Cl. 18—2        1 Claim

ABSTRACT OF THE DISCLOSURE

A tire press for shaping and curing an unvulcanized tire which comprises a vulcanizing section having two mold portions for receiving and vulcanizing an unvulcanized tire and also having a bead treating section for flattening the inner diameter of the tire beads prior to the insertion of the unvulcanized tire into said mold sections, boom means being provided which carry a conical tire supporting U-shaped member associated with the tire treating section and being operable after receiving a tire to move the same between said mold portions.

---

The present invention relates to a charging device for tire vulcanizing presses, especially for such vulcanizing presses in which the bead seating rings of the lower and upper mold section will during the closure of the press grasp the beads of the unvulcanized tire. Furthermore, the invention concerns such devices of the above mentioned type which are provided with a supporting body adapted to receive the unvulcanized tire and to move between the upper and lower section of the vulcanizing press, and with a mandrel adapted to center the said supporting body with regard to the unvulcanized tire.

Charging devices of this type are generally so designed that the unvulcanized tire is placed upon the supporting body. Subsequently thereto, the supporting body is moved between the upper and lower mold section while the mold is in opened condition so that the unvulcanized tire will be approximately concentrically arranged with regard to the two mold sections. When the supporting body is still outside the mold, in other words when the charging operation has not yet been initiated, the unvulcanized tire rests upon the above mentioned supporting body while embracing the above referred to mandrel which generally is located stationarily, which means does not together with the supporting body carry out the movement required for the charging operation.

It is an object of the present invention further to improve the above outlined charging device so that during the closing of the vulcanizing press a proper seating of the tire beads will be assured.

It is another object of this invention to provide a device as set forth in the preceding paragraph, in which the mandrel associated with the supporting body for the unvulcanized tire will not only be usable for tires of different inner diameters but will also be able to aid in the preparation of a working operation which will facilitate the insertion of the unvulcanized tire into its mold and also will facilitate the molding of the tire.

These and other objects and advantages of the invention will appear more clearly from the following specification in connection with the accompanying drawing, in which:

FIG. 1 diagrammatically illustrates a charging device according to the invention and a tire vulcanizing press.

FIG. 2 is a top view of the supporting body for the unvulcanized tire and also shows in section the centering mandrel of the charging device according to FIG. 1.

FIGS. 3 and 4 illustrate details concerning the operation of the mandrel associated with the supporting body.

In conformity with the present invention, the mandrel associated with the supporting body for the unvulcanized tire is variable in diameter. This affords the possibility of employing the said mandrel not only for tires of different inner diameters but also makes it possible by means of the mandrel to prepare a working operation which facilitates the molding and the insertion of the unvulcanized tire into its mold. When the unvulcanized tire is outside the vulcanizing press on the supporting body therefor, the mandrel embraced by the unvulcanized tire will be increased as to its diameter to such an extent that the said mandrel will engage the inner circumferential surfaces of the tire beads and will deform the same to the desired extent while, generally, it is sufficient when a mandrel with a cylindrical outer surface is employed and consequently during the increase of the diameter of the mandrel on the inner circumferential surface of the tire beads a corresponding cylindrical, and if desired slightly conical, surface is produced. The present invention is based on the concept that the charging device should at the same time be employed for preparing advantageous working operations for the molding of the unvulcanized tire.

Referring more specifically to the drawing, FIG. 1 illustrates a tire vulcanizing press which may be of any standard design and of which for purpose of simplifying its illustration merely the upper portion 2 and the lower portion 3 have been shown. These upper and lower press portions have associated therewith corresponding cups or sections of the vulcanizing press (not illustrated). Preferably, the vulcanizing press is provided with a device which during the closing of the vulcanizing press 1 will bring about a curving or partial curving of the unvulcanized tire 4.

When closing the vulcanizing press 1, a perfect molding of the unvulcanized tire 4 will be obtained only when the seating surfaces on the inner circumference of the two molding sections properly engage the two beads 5 of the unvulcanized tire.

Outside the vulcanizing press 1 on a frame 6 there is mounted a mandrel 7 which has the form of a hollow cylinder composed of four segments 8, 9, 10 and 11. The device furthermore comprises a supporting body 12 which, as shown in FIG. 2, is U-shaped in top view and which has walls 13 (FIG. 1) which flare conically in upward direction and serve for supporting the unvulcanized tire 4 when the latter has been placed upon the mandrel 7.

The supporting body 12 is connected to arms 12a (indicated diagrammatically only) which make it possible, e.g. hydraulically, to move the supporting body 12 and, therefore, also the unvulcanized tire 4 in the direction of the arrow 14, which means between the two parts 2 and 3 of the vulcanizing press 1 so that in the end position of the supporting body 12, the unvulcanized tire 4 will be coaxially arranged with regard to the mold sections.

By means of a rod 15 which is adapted to be moved upwardly and downwardly and which is also adapted to actuate lever 16 operable in the manner of elbow levers, the segments 8 to 11 can be adjusted in radial direction in such a way that a change in the diameter of mandrel 7 will be possible. The segments 8 to 11 may be guided radially in any convenient manner, for instance by means of rails 17.

The unvulcanized tire 4 is first placed upon the mandrel 7 and is centered by the latter with regard to the supporting body 12. It is a matter of course that in this connection the outer diameter of mandrel 7 will be so adjusted that, as illustrated in FIGS. 1 and 3, between the outer surface of mandrel 7 and the tire beads 5 there will prevail a play as indicated at 18 in FIG. 3.

Thereupon, by moving rod 15 in upward direction, the diameter of mandrel 7 is increased in such a way that its outer surface acts upon the inner surface of beads 5 and thus brings about a deformation of beads 5 in the manner illustrated in FIG. 4. In this way a cylindrical inner surface 19 will be produced on beads 5.

In order to make sure that the supporting body 12 will move the unvulcanized tire 4 in the direction of the arrows 14, 14a (FIG. 1) and thus into the vulcanizing press 1, the diameter of the mandrel is reduced to the starting dimensions according to FIGS. 1 and 3.

Inasmuch as the beads 5 now have undergone a pre-compression or have relatively precise surfaces 19, it will be assured that when closing the vulcanizing press 1, undesired deformations of the tire beads 5 will be avoided and consequently a proper forming of the tire will be assured.

In order to be able to produce relatively large diameter changes of mandrel 7, segments 8, 10 and 9, 11 arranged in pairs and located opposite to each other are employed, the segments of different pairs being of different length. It will thus be possible to permit the smaller segments 9, 11 first to collapse and then to carry out the following movements of the segments 8, 10.

It is, of course, to be understood that the present invention is, by no means, limited to the particular arrangement shown in the drawing but also comprises any modifications within the scope of the appended claim.

What I claim is:

1. In a tire press for shaping and curing an unvulcanized tire, which includes: a vulcanizing section having two mold portions movable relative to each other in vertical direction away from each other to permit the movement of an unvulcanized tire therebetween and toward each other to enclose the unvulcanized tire moved between said mold portions, a bead treating section located laterally of said vulcanizing section and having stationary frame means, and a mandrel comprising a plurality of segmental portions supported by said frame means and substantially radially outwardly and inwardly slidable on said frame means along a substantially horizontal plane for selectively increasing and decreasing the diameter of said mandrel, said segmental portions when in their outwardly moved vulcanizing position having their outer periphery form a nearly closed circular contour, a U-shaped supporting member surrounding said mandrel and having conical supporting surface means for receiving and supporting the tire to be vulcanized, said segmental portions of said mandrel being operable in response to their substantially radial outward movement to exert a centering and flattening pressure upon the beads of a tire on said supporting means, boom means carrying said supporting means, and power operable actuating means operable selectively to turn said boom means by about 180° to move an unvulcanized tire on said supporting means into position between said mold portions for vulcanization therein.

References Cited
UNITED STATES PATENTS

| | | |
|---|---|---|
| 2,697,853 | 12/1954 | Smyser. |
| 2,915,783 | 12/1959 | Fassero et al. |
| 3,134,136 | 5/1964 | Soderquist. |
| 3,229,329 | 1/1966 | Heston et al. |

J. HOWARD FLINT, JR., *Primary Examiner.*

U.S. Cl. X.R.

18—18